(12) United States Patent
Slaats et al.

(10) Patent No.: US 10,889,126 B2
(45) Date of Patent: Jan. 12, 2021

(54) METHOD OF PRINTING SWATHS OF AN IMAGE ON A SUBSTRATE

(71) Applicant: Océ Holding B.V., Venlo (NL)

(72) Inventors: Bianca P. S. Slaats, Venlo (NL); Eduard T. H. De Grijs, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 40 days.

(21) Appl. No.: 16/279,596

(22) Filed: Feb. 19, 2019

(65) Prior Publication Data

US 2019/0255858 A1 Aug. 22, 2019

(30) Foreign Application Priority Data

Feb. 20, 2018 (EP) .................................... 18157526

(51) Int. Cl.
*B41J 2/21* (2006.01)
*G06K 15/10* (2006.01)

(52) U.S. Cl.
CPC .......... *B41J 2/2103* (2013.01); *B41J 2/2132* (2013.01); *G06K 15/105* (2013.01)

(58) Field of Classification Search
CPC ...... B41J 2/2103; B41J 2/2132; G06K 15/105
See application file for complete search history.

(56) References Cited

U.S. PATENT DOCUMENTS

| 8,570,604 B2 * | 10/2013 | Bane | G06K 15/107 347/1 |
| 2005/0285898 A1 | 12/2005 | Fagan et al. | |
| 2011/0043833 A1 | 2/2011 | Swanson et al. | |

FOREIGN PATENT DOCUMENTS

| EP | 3527384 A1 * | 8/2019 | ............ B41J 2/2103 |
| WO | WO 2008/040968 A1 | 4/2008 | |

OTHER PUBLICATIONS

Search Report for European Patent Application No. 18 15 7526, completed on Jul. 23, 2018.

* cited by examiner

*Primary Examiner* — Huan H Tran
(74) *Attorney, Agent, or Firm* — Birch, Stewart, Kolasch & Birch, LLP

(57) ABSTRACT

A printing method wherein a scanning-type printer, or a printer comprising a page-wide array of multiple printheads, is used for printing an image on a substrate in a plurality of adjacent swaths, the method comprising a step of determining positions of boundaries between the adjacent swaths on the basis of image contents to be printed, preferentially in such a way that artefacts are least likely to be visible.

10 Claims, 4 Drawing Sheets

METHOD OF PRINTING SWATHS OF AN IMAGE ON A SUBSTRATE

BACKGROUND OF THE INVENTION

1. Field of the Invention

The invention relates to a printing method wherein an image is printed on a substrate in a plurality of adjacent swaths. The invention further relates to a scanning-type printer and a software product.

2. Description of the Related Art

As is well known in the art, a scanning-type printer typically has a carriage that is driven to move in a main scanning direction across a print surface on which the substrate is placed, and an advance mechanism controls a relative movement of the substrate and the carriage in a sub-scanning direction normal to the main scanning direction.

The carriage has at least one print head with a plurality of print elements aligned in the sub-scanning direction, so that a swath of an image can be printed in each scan pass of the carriage, with the width of the swath being determined by the number of successive print elements that are used for printing. Then, the substrate is advanced relative to the carriage by the width of the swath, so that a next swath can be printed.

In order to avoid visible artefacts at the boundaries between adjacent swaths, it is important to control the advance of the substrate with high precision so that the swaths will neither overlap nor be separated by a gap.

In certain applications it is difficult, however, to control the advance of the substrate with sufficient accuracy, especially when the substrate has large dimensions or some resiliency.

In order to mitigate the visibility of artefacts in such a case, it has been known for long to blur the swath boundaries. That means that, rather than providing a sharp boundary between two adjacent swaths, there is a certain transition zone between the adjacent swaths and, within this transition zone, some pixels are printed in a first scan pass and the remaining pixels are filled-in in a subsequent scan pass. The number of pixels per surface area that are printed in the first scan pass is gradually decreased in the direction from the swath printed first towards the swath printed in the second scan pas, so that the image contents of the first swath is gradually faded-out while the image contents of the subsequent swath are gradually faded-in. As a result, any possible errors in the advance step width of the substrate will not be concentrated at a sharp boundary but will be distributed over the transition zone, so that the artefacts are less perceptible. Nevertheless, the artefacts may still be visible to some extent.

It is an object of the invention to provide a printing method which permits to suppress visible artefacts at the boundaries between adjacent swaths more effectively.

SUMMARY OF THE INVENTION

In order to achieve this object, the method according to the invention comprises a step of determining a position of a boundary between the adjacent swaths on the basis of image contents to be printed, with preference being given to boundary locations where artefacts are least likely to be visible.

Whereas, in conventional printing methods, the widths of the swaths and, consequently, the locations of the boundaries or transition zones between adjacent swaths are fixed, regardless of the image contents to be printed, the invention is based on the idea to shift the swath boundaries to positions where the artefacts are invisible or are at least less likely to be visible. For example, when the image contents comprises text with black letters on a white background, artefacts resulting from advance step errors will be readily visible if the boundary between two swaths happens to be located within a text line. However, if the position of the boundary is shifted into a gap between two text lines, no black pixels will be printed directly at the boundary, and the surface of the substrate remains white, regardless of any possible errors in the advance step width. Similarly, if the image contents comprise, for example, a halftone image it will in many cases be possible to shift the swath boundary to a location where the image density is low, so that artefacts will be significantly less prominent than in areas with high image density.

More specific optional features of the invention are indicated in the dependent claims.

In a method according to the invention, a boundary between two adjacent swathes may be, but does not have to be a continuous straight line that extends in the main scanning direction from one edge of the substrate to the opposite edge. Instead, the position of the boundary in the sub-scanning direction may vary as a function of the position in the main scanning direction. This provides more freedom of choice for avoiding dark image areas where artefacts at the boundary would be clearly visible. For example, the image to be printed may be segmented into a number of columns of image pixels that extend in the sub-scanning direction and have a width of one or more pixels. Then, the position of the boundary in a given column may be determined independently of the boundary positions in other columns.

Several criteria and combinations of criteria may be applied for finding the best position for the boundary within a column. One criterion may be that the optical density or "distance to white" (DTW), which is a distance of a color to a white color in a color space, such as delta E in $L^*a^*b^*$-space, should be minimal. Another criterion may be that a boundary should preferably be located in a low contrast area of the image. These criteria may be combined for example by requiring that the boundary should be located in a minimum of the DTW curve, and this minimum should have a certain minimum width. There may be cases where the DTW curve has more than one minimum. In that case, a good choice for the boundary position, in order to suppress artefacts as far as possible, would be the center of the widest minimum. On the other hand, in terms of productivity, it may be preferred to select a minimum that imposes fewer constraints on the width of the swath and thereby allows for a higher productivity.

In a method of color printing, one option is to use one swath boundary for all colors, and another option is to use separate swath boundaries for each color.

The invention is not limited to printing methods in which the swaths are printed one after the other in a plurality of scan passes. Rather, the invention may also be useful in applications where a page-wide print head assembly is used and wherein several print heads are staggered in the (main) scanning direction and have some overlap in the width direction of the page. Then, artefacts may be produced if the individual print heads are not perfectly aligned with one another in the width direction. Furthermore, artefacts may occur from substrate movements in a direction perpendicular to the transport direction during the time one of the print heads has printed, whereas another print head has not yet. The method according to the invention is useful for suppressing such artefacts. Thus, a scanning-type printer also refers to a printer having a page-wide array of multiple print heads that apply ink in one pass. In fact, the various swaths applied by the different print heads are printed simultaneously, instead of consecutively as in a more traditional scanning-type printer.

BRIEF DESCRIPTION OF THE DRAWINGS

Embodiment examples will now be described in conjunction with the drawings, wherein.

DETAILED DESCRIPTION OF EMBODIMENTS

Figure 1:
FIG. 1 shows a portion of a printed image that includes a swath boundary constructed according to the principles of the invention.

The present invention will now be described with reference to the accompanying drawings, wherein the same or similar elements are identified with the same reference numeral.

FIG. 1 shows an example of a portion of a printed image 10 that comprises, as image contents, a plurality of text elements 12 with different font sizes. In order to print the image 10, a print head is moved over a print substrate in a main scanning direction (x) in several subsequent scan passes, and a swath of the image 10 is printed in each pass. After each pass, the print substrate is advanced in a sub-scanning direction y by a distance corresponding to the width of the printed swath, so that another swath can be printed directly adjacent to the first swath. A boundary 14 between two adjacent swaths has been symbolized in FIG. 1 by a bold line that extends essentially in the main scanning direction x but is split into a plurality of straight segments that are slightly offset relative to one another in the sub-scanning direction y. The position of each segment of the boundary 14 in the y-direction has been selected such that the boundary avoids the text elements 12 and passes only through white background areas of the image 10.

The reason for this choice of the boundary 14 is that, with this choice, even when the advance mechanism advancing the print substrate relative to the print head in the sub-scanning direction y is not perfectly accurate and produces errors that result either in a gap between the two adjacent swaths or in an overlap of the two swaths, such artefacts (gaps or overlaps) remain invisible because the boundary 14 passes only through white background areas where nothing will be printed, anyway.

A method of forming the swath boundary 14 with a desired configuration will now be explained in conjunction with FIG. 2.

FIG. 2(A) shows a print head 16 that is controlled by a controller C and has a linear array 18 of pixel-sized printing elements and is moved in a first scan pas in positive x-direction, as indicated by an arrow. During this scan pass, it is possible to print a swath of the image 10. The maximum possible width of the swath 20 is limited by the width of the array 18 of printing elements. It is possible, however, to keep some of the printing elements at both ends of the array 18 silent, i.e. unused in the present swath, so that only a swath with a smaller width is printed.

FIG. 2(B) shows a situation in which the swath 20 has been completed, and the print head 16 moves, in a subsequent scan pass, in opposite direction in order to print another swath 22 of the image. It will be understood, between the two scan passes, the substrate on which the image 10 is being printed has been moved, relative to the path of travel of the print head 16, in sub-scanning direction y by a step width which is equal to or smaller than the width of the array 18 of printing elements. In the example shown in FIG. 2(B), the step width has been selected to be smaller than the width of the array 18, so that there is a certain zone of overlap 24 between the swathes 20 and 22. By appropriately controlling the printing elements that scan this zone of overlap 24 in the two scan passes, i.e. either by activating the printing elements in order to print the image contents or by keeping them silent, the actual boundary 14 between the two swathes can be adjusted to any desired position within the zone of overlap 24.

Figure 2:
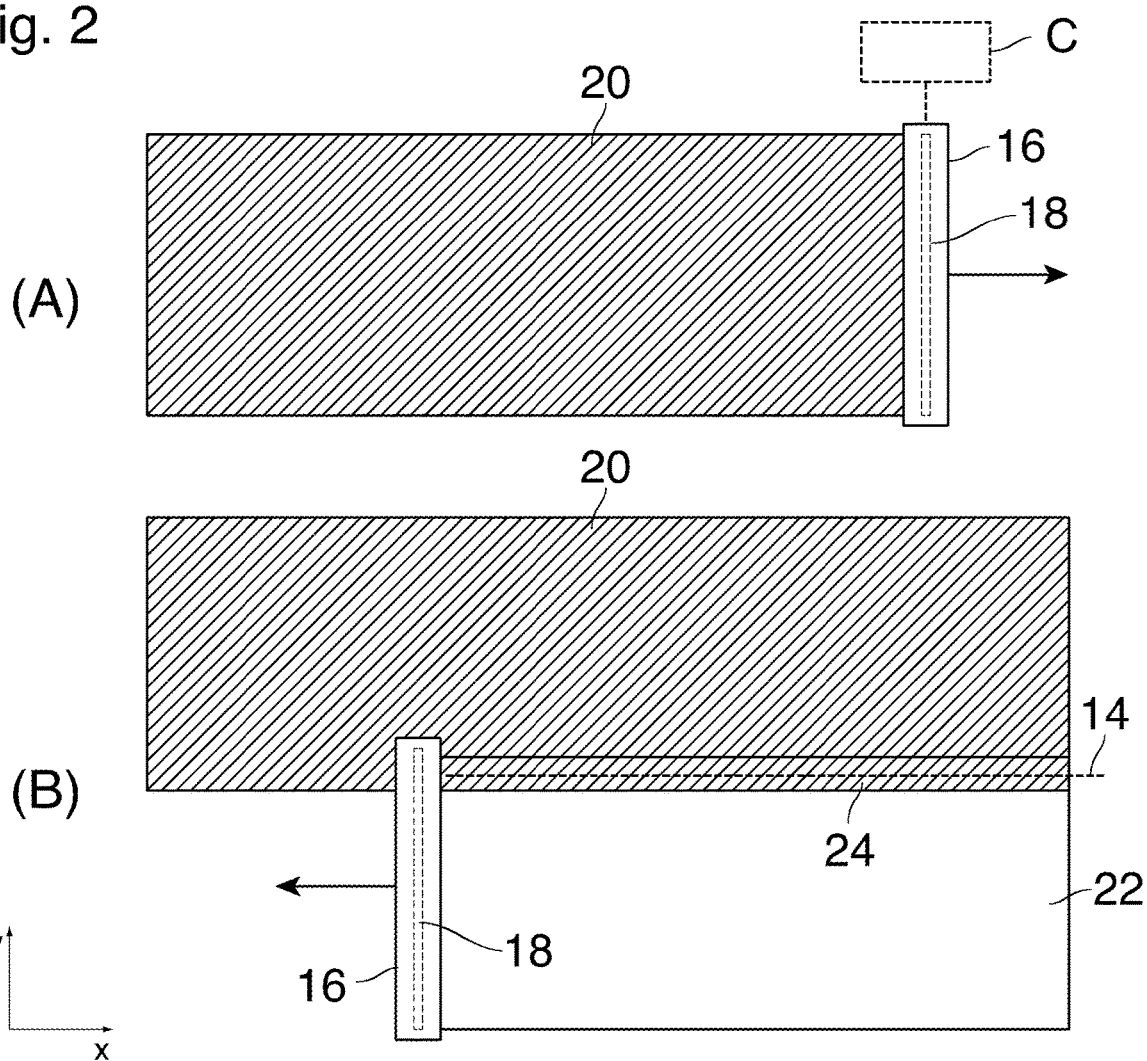
FIG. 2 illustrates a printing method wherein a print head is moved across a print surface in several scan passes.

If the configuration of active and inactive printing elements is kept constant during the entire scan pass, the resulting boundary 14 will be a straight line as in FIG. 2. However, if the configuration of active and inactive printing elements is changed during the scan pass, the boundary 14 will shift accordingly, as has been shown in FIG. 1.

When the first swath 20 of the image 10 is printed, an upper boundary of the swath will naturally be formed by the upper edge of the substrate sheet on which the image is formed or by the upper edge of a printable area on the substrate sheet. The lower boundary will then be determined on the basis of the image contents as described above. Then, when the substrate sheet has been transported in y-direction in order to print the next swath 22, the lower boundary of the first swath 20 will at the same time be the upper boundary of the subsequent swath 22, so that the data defining the boundary 14 may be saved for forming the upper boundary of the next swath. Then, the lower boundary of the swath 22 will be determined in the same manner as described above and the data will again be saved for the upper boundary of the next swath, and so forth.

Ideally, the step width by which the print substrate is transported in y-direction between two swaths (or, equivalently, the distance by which a gantry along which the print head 16 moves in the main scanning direction x is moved relatively to the print substrate in −y-direction) should be an integer multiple of the size of one pixel, so that the pixel raster defined by the array 18 of printing elements when printing the first swath 20 is perfectly aligned with the pixel raster in the step of printing the second swath 22. In practice, however, there may be alignment errors which may cause visible artefacts at the swath boundary, if that boundary is not properly positioned in a white background area of the image 10.

The step width by which the print substrate is moved relative to the print head between subsequent swaths may be kept constant during the entire print process, so that the number of swaths needed for printing the entire image 10 will be fixed.

In a modified embodiment, however, the step width may be determined individually for each swath to be printed. Then, depending upon the image contents, it may be possible to shift the lower boundary of the swath further downwards within the zone of overlap 24, so that the effective width of the swath increases. If that strategy can be applied successfully in several swaths of the image, the total number of required swaths may be decreased, so that the productivity of the print process is enhanced.

Figure 3:
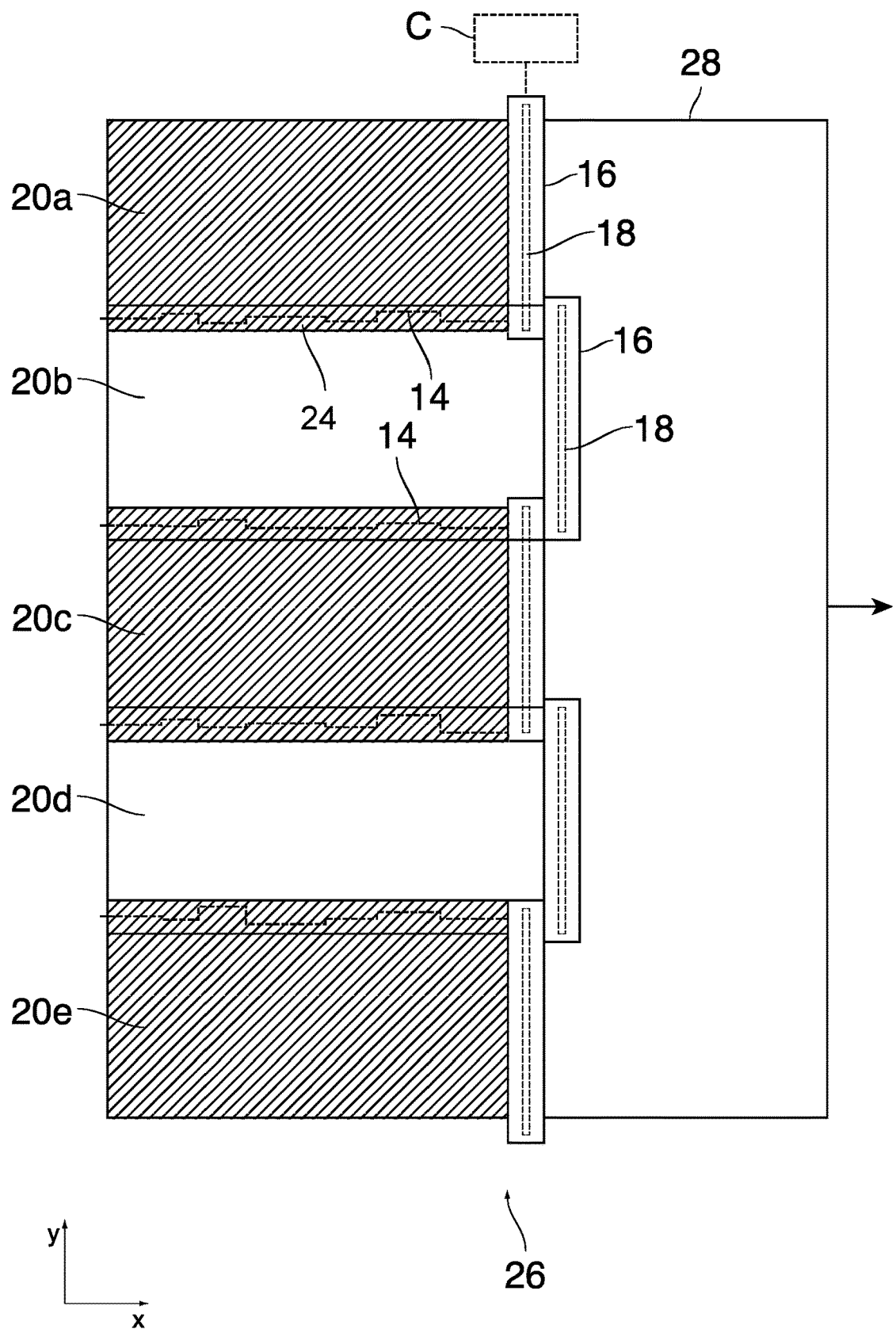
FIG. 3 illustrates a printing method using a page-wide print head assembly with staggered print heads for printing adjacent swaths of an image.

In general, the field of applicability of the invention is not limited to the case that a print head scans a print substrate in a plurality of scan passes so as to form swaths of the image one after the other. As another example, FIG. 3 illustrates a printing system wherein a page-wide print head assembly 26 extends over the entire width of a print substrate 28 that is moved relative to the stationary print head assembly in the direction x which is the only scanning direction in this case. The print head assembly 26 is composed of a plurality of print heads 16 which are staggered such that the ends of their arrays 18 of printing elements overlap. Correspondingly, the printed image is composed of swaths 20a-20e with zones of overlap 24 formed between each pair of swaths.

Although all swaths 20a-20e are printed simultaneously in this case, artefacts at the swath boundaries 14 may still occur, due to alignment errors concerning the relative positions of the individual print heads 16 in the direction y normal to the scanning direction x and print substrate movements in the y direction. Such alignment errors may be produced in the process of mounting the print heads 16 in the print head assembly 26, but may also be induced by a thermal expansion and shrinkage of the print head assembly 26, for example. Again, the visibility of the artefacts can be reduced by properly selecting the locations of the swath boundaries 14 in accordance with the image contents to be printed.

Strategies for finding optimal or nearly optimal positions for the swath boundaries 14 in accordance with the image contents will now be described in conjunction with FIGS. 4 to 7.

Figure 4:
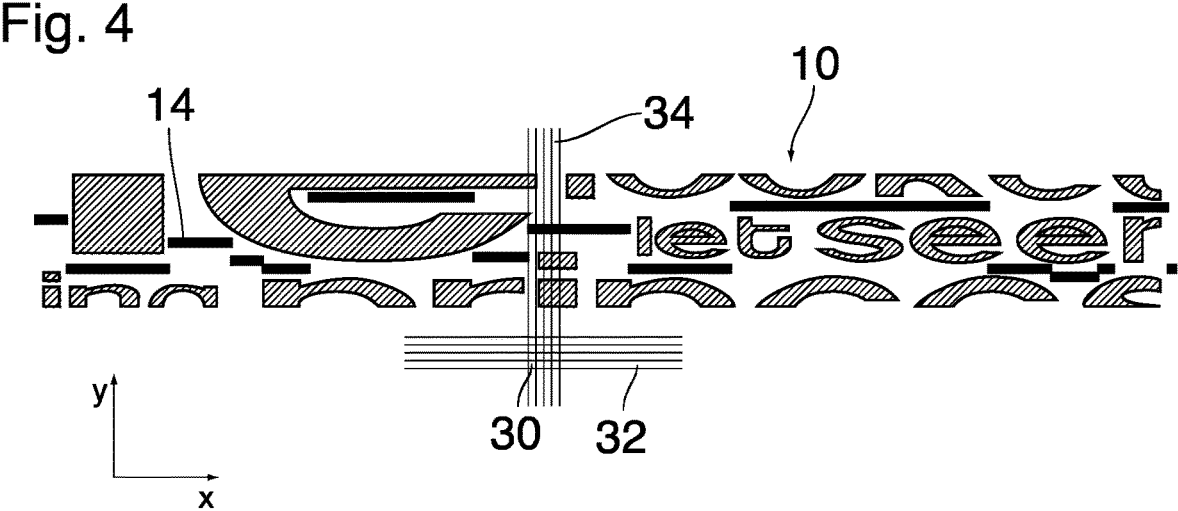
FIG. 4 shows an enlarged detail of the printed image shown in FIG. 1, together with another example of a swath boundary.

FIG. 4 is an enlarged view of a portion of the image 10 that has also been shown in FIG. 1. The image is composed of a raster of pixels 30 that are arranged in lines 32 and columns 34. The swath boundary 14 has been represented by a segmented line of black pixels. It can be seen that, in principle, the position of the boundary 14 in y-direction can be selected individually for each pixel column 34, independently of the positions of the boundary in other columns. The segments of the boundary 14 shown in FIG. 4 have been positioned so as to fit in the white gaps between the dark image areas (letters) in order to minimize the risk of visible artefacts. Where possible, the positions of the boundary 14 in the different columns 34 have been selected such that the y-position of the boundary is the same for neighboring columns 34, so that the boundary is "smoothened", i.e. the number of segments forming the boundary is reduced as far as possible. It is possible, however, and, depending upon the image contents, may even be necessary to shift the y-position of the boundary 14 from column to column, so that the boundary as a whole would look rather ragged. Since a shift of the boundary 14 does not involve any mechanical adjustment but is simply achieved by appropriately controlling the printing elements, such a ragged boundary has no impact on the print productivity.

Figure 5:
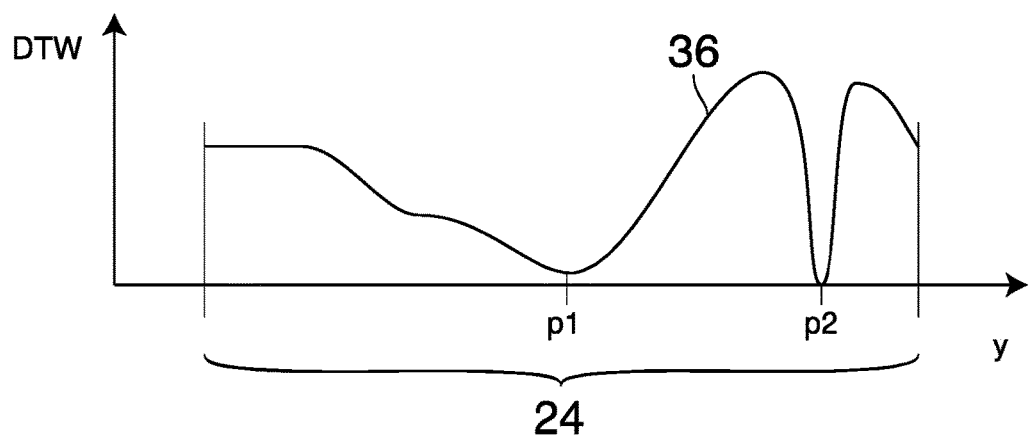
FIGS. 5 to 7 are diagrams illustrating strategies for finding an optimal position and configuration for the swath boundary.

FIG. 5 illustrates a possible strategy for finding an optimal position for the boundary 14 in an individual pixel column 34 of the image 10. The optical density or "distance to white" (DTW) of the image has been plotted as a function of the y-position in the pertinent pixel column. The plot covers the entire zone of overlap 24 between two adjacent swathes. In the example shown, the image 10 is a halftone image or photo, so that the DTW is a continuous function of y, the function being represented by a smooth curve 36.

Generalizing the principle according to which preferred positions of the boundary 14 are on the white background of the image, a useful strategy is to search for minima in the curve 36. In the example shown, the curve 36 has two minima, namely a relatively wide minimum at a position p1 and an even deeper but narrower minimum at a position p2. If the position p2 were selected for the boundary 14, there might still be a considerable risk of visible artefacts because, since the minimum is so narrow, extending only over one or a few pixels, for example, even minor alignment errors could move the boundary out of the minimum, so that artefacts would become visible again. Therefore, it is safer to select the position p1 for the boundary, so that the low density of the image in that area largely obscures possible artefacts and, on the other hand, the boundary can be safely localized in the low density region. An algorithm for finding the best position for the boundary can be constructed by defining a quality function that depends on the local DTW and on a measure that describes the width of the minima in the curve 36.

Figure 6:
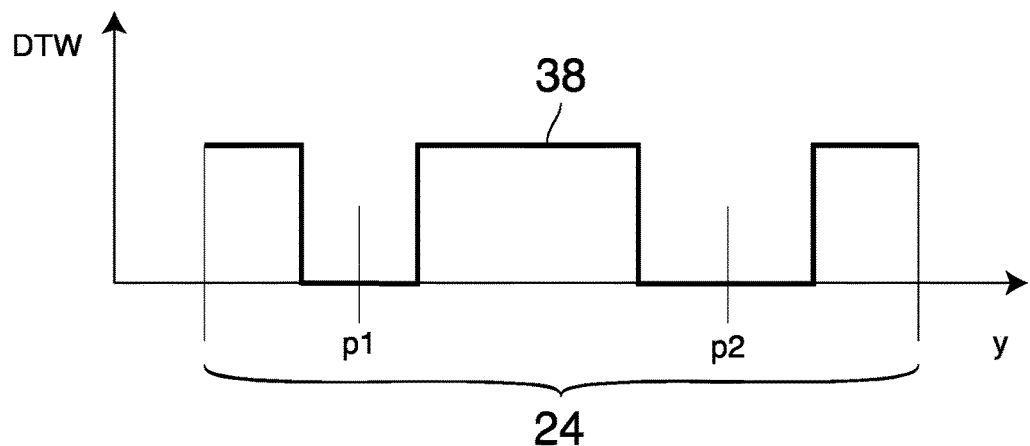

FIG. 6 illustrates another example where the image 10 is a binary image comprising only black and white pixels, so that the DTW function is described by a rectangular curve 38. Again, the curve has two minima at positions p1 and p2, and both minima have the same depth (DTW=0). Applying the same principles as in FIG. 5 would result in the position p2 as the best position for the boundary, because the minimum at p2 is wider. In this case, however, the minimum at p1 is wide enough that the boundary could also be safely localized in that minimum and the image quality would be just as good if p1 were selected as the boundary position. However, in a print process of the type shown in FIG. 2, wherein the width of the substrate advance steps is variable, the boundary at the position p1 has the advantage that the (lower) boundary of the swath is shifted to a lower position, which results in a larger width of the swath and, accordingly, a higher productivity. Therefore, in a print process with variable step widths, it is preferable to take also the achievable swath widths into account.

Figure 7:
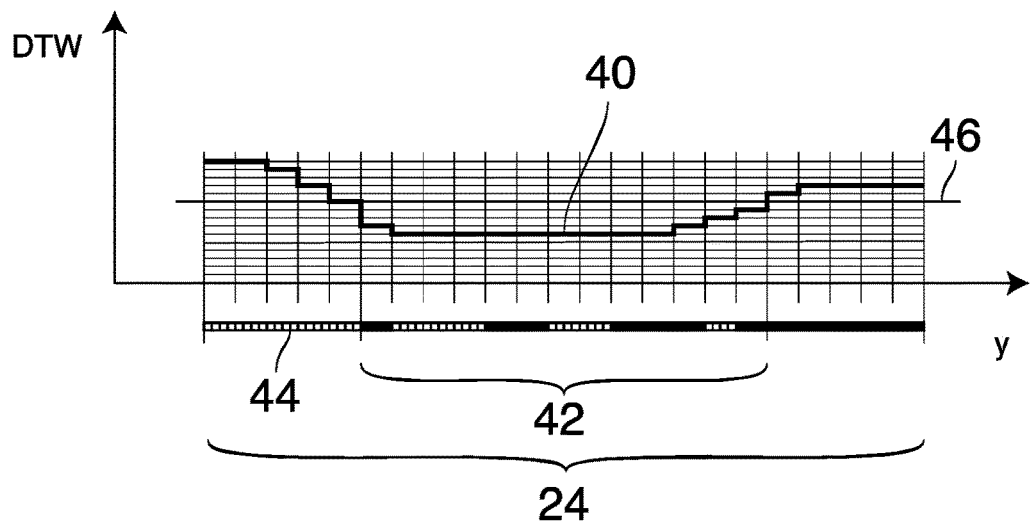

FIG. 7 illustrates yet another example wherein the image 10 is a halftone image resulting from a halftone process in which the original image is thresholded with a 4×4 dither matrix. Thus, the image consists of macro pixels each of which is composed of 16 micro pixels and, consequently can have one of 16 different density values, as illustrated by a curve 40 in FIG. 7. Since each macro pixel is a 4×4 matrix, each macro pixel column (equivalent to column 34 in FIG. 4) has a width of 4 micro pixel. Similarly, the DTW values plotted in FIG. 7 apply to individual macro pixels each having a height of 4 micro pixels in y-direction.

The halftone process that has been employed in this example could lead to a certain blur in the swath boundaries 14. This blur may help to obscure artefacts in case of alignment errors, as long as the alignment error is not larger than the width of one macro pixel.

The y-position of the boundary 14 does not have to be a boundary between two adjacent macro pixels but may also go through a macro pixel. In that case, when a pixel at the boundary is printed in the first swath, the entire macro pixel will be printed, but with a density value that has been reduced in proportion to the area of the macro pixel that is outside of the boundary. Then, when the same pixel is printed in the next swath, the entire macro pixel is printed again, but only with a density value that corresponds to the part that is then inside of the boundary of the new swath. Thus, in absence of alignment errors, the densities printed in the two swathes will add up to the original density of the macro pixel. In this way, the position of the boundary can be selected with high resolution in order for the boundary to fit better into narrow white gaps in the image contents.

In the example shown in FIG. 7, the curve 40 has a relatively wide but shallow minimum. Thus, the image has no white area where an alignment error could be obscured completely. Thus, even if the swath boundary is positioned in the minimum of the curve 40, visible artefacts might still occur.

In order to reduce the visibility of these artefacts, it is possible to recur to the known technique of blurring the swath boundary. In the example shown, this has been achieved by defining a transition zone 42 which extends essentially over the width of the minimum of the curve 40 and in which the image printed in the first swath (large y-value) is gradually faded-out, and the image printed in the second swath (small y) is gradually faded-in. In FIG. 7, this has been illustrated by a pixel line 44 wherein micro pixels printed in the first swath have been shown in black and micro pixels printed in the second swath have been shown in white. In the example shown, the transition zone 42 extends over 13 macro pixels, and the proportion between black and white macro pixels gradually increases with increasing y.

In order to define a suitable position and width of the transition zone 42, it is possible to define a threshold value 46 which is a certain percentage higher than the smallest DTW value in the minimum. This will assure that the blur of the boundary is increased automatically when the minimum is shallower and, accordingly, artefacts are more likely to be visible.

Figure 8:
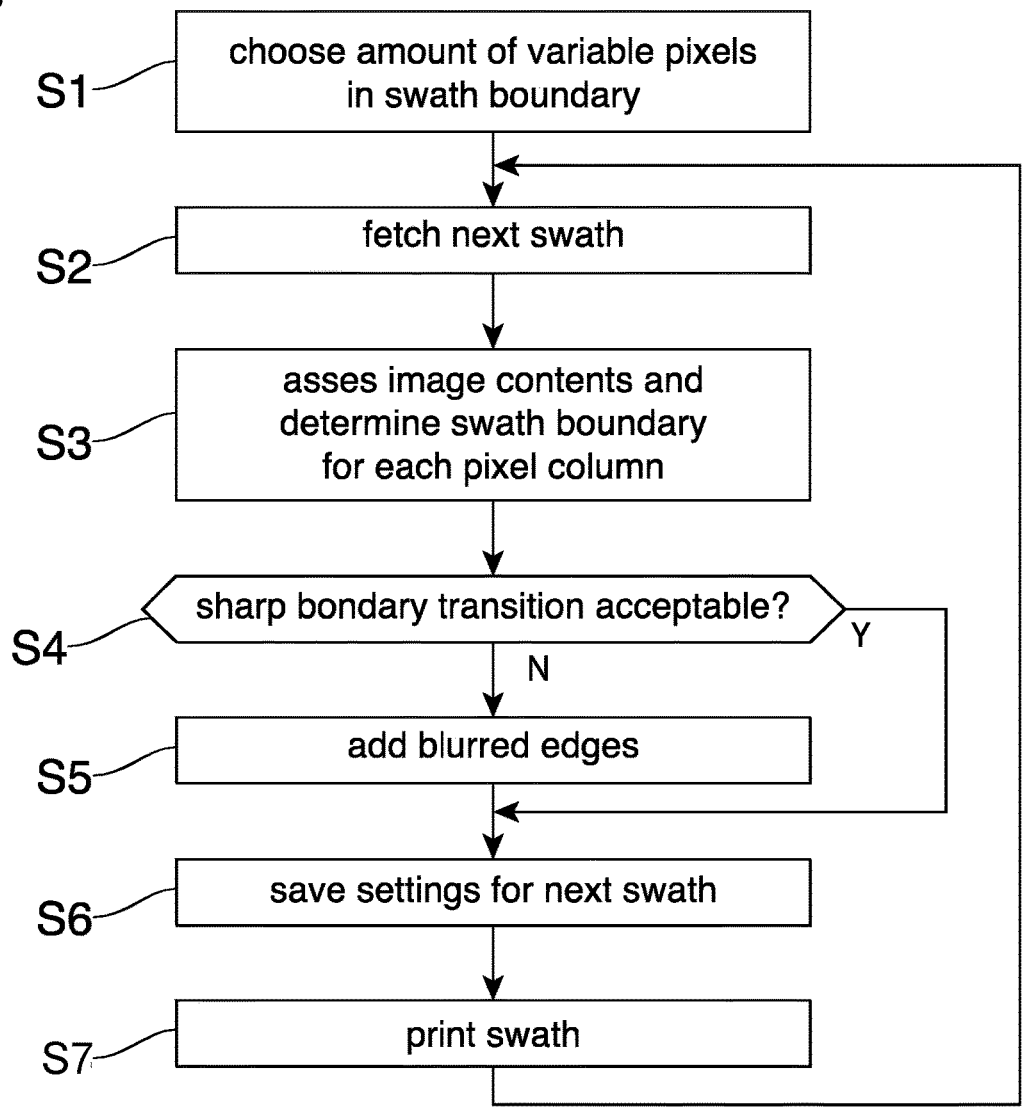
FIG. 8 is a flow diagram illustrating the steps of a method according to the invention.

A possible implementation of a method according to the invention will now be described by reference to a flow diagram shown in FIG. 8. More particularly, this implementation applies to the situation shown in FIG. 2 where the swathes are printed one after the other. It shall further be assumed that the width of the zones of overlap 24 is the same for all pairs of swathes.

In step S1, the width of the zones of overlap 24 is determined by choosing the number of variable pixels, i.e. the number of adjacent printing elements at each end of the arrays 18 which can be switched between the active state and the inactive state.

Then, the image data for a next swath to be printed are fetched in step S2. At the start of the print process, the "next" swath will be the first swath, and, as the printing operation proceeds, the "next" swath will always be the swath that follows immediately to the swath that has just been printed.

In step S3, the image contents to be printed within the zone of overlap 24 are assessed in order to find the best position for the swath boundary 14. This assessment is made separately for each pixel column 34.

Then, in step S4, it is checked whether a sharp boundary transition is acceptable or whether the boundary should be blurred. The result of the check in step S4 will be "yes" (Y) either if the image contents provide sufficiently large white gaps for obscuring the boundary or the boundary 14 that has been determined independently for each pixel column is so ragged that artefacts resulting from a possible alignment error are spread over a sufficiently large range of y values.

If the result in step S4 is "no" (N), then blurred edges are added in step S5. This means that the sharp boundary is replaced by a transition zone 42 as in FIG. 7. Of course, this is possible not only for halftone images but also for binary images.

Then, in step S6, the settings that have been determined in steps S3 and S5 are saved for determining the top boundary of the next swath to be printed. Finally, the present swath is printed in step S7, and the process loops back to step S2.

This concludes the description of embodiments of the invention. It should be understood, however, that there is no intention to limit the invention to the specific forms disclosed, but on the contrary, the invention is to cover all modifications, alternate constructions and equivalents falling within the scope of the invention as expressed in the following claims.

The invention claimed is:

1. A method for printing an image on a substrate in a plurality of adjacent swaths extending in a main scanning direction, said method comprising the step of:
   determining a position of a boundary between adjacent swaths based on a content of an image to be printed,
   wherein the step of determining the position of the boundary includes searching for a minimum in a relation between an optical density of the image to be printed and a position in a sub-scanning direction normal to the main scanning direction.

2. The method according to claim 1, wherein the position of the boundary of a swath is determined by controlling printing elements of a scanning-type printer, said printing elements being arranged in an array that extends in the sub-scanning direction, and
   wherein a number of printing elements in the array is determined that are used for printing the swath in dependence on the content of the image to be printed.

3. The method according to claim 1, wherein the swath boundary is determined to have a staircase shape constituted by segments that are parallel with the main scanning direction and offset relative to one another in the sub-scanning direction.

4. The method according to claim 1, wherein the swath boundary is determined individually for each pixel column in the image to be printed.

5. The method according to claim 2, wherein the swaths are printed one after the other in successive scan passes of a print head and
   wherein the print head and the print substrate are moved relative to one another in the sub-scanning direction by a predetermined step width after each scan pass.

6. The method according to claim 5, wherein the step width is determined independently for each swath.

7. The method according to claim 1, wherein the step of determining the position of the boundary includes a step of assessing a width of each of the minimum in said relation.

8. The method according to claim 1, comprising a step of deciding, on the basis of the image contents to be printed, whether or not a boundary is blurred by an image processing operation.

9. A scanning-type printer comprising:
   a print head assembly having at least one print head and being arranged to print an image in a number of adjacent swaths; and
   a controller for controlling operations of said at least one print head, wherein the controller is configured to perform the method according to claim 1.

10. A software product comprising program code on a machine-readable, non-transitory medium, the program code, when loaded into a controller of the printer according to claim 9, causing the controller to perform a method for printing an image on a substrate in a plurality of adjacent swaths, said method comprising the step of determining a position of a boundary between adjacent swaths based on a content of an image to be printed.

* * * * *